United States Patent
Song et al.

(10) Patent No.: US 9,733,792 B2
(45) Date of Patent: Aug. 15, 2017

(54) SPATIALLY-AWARE PROJECTION PEN

(75) Inventors: Hyunyoung Song, Ithaca, NY (US);
 Tovi Grossman, Toronto (CA); George Fitzmaurice, Toronto (CA); Francois V. Guimbretiere, Ithaca, NY (US);
 Azam Khan, Aurora (CA); Ramtin Attar, Toronto (CA); Gordon Kurtenbach, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 1141 days.

(21) Appl. No.: 12/537,013

(22) Filed: Aug. 6, 2009

(65) Prior Publication Data

US 2010/0103178 A1    Apr. 29, 2010

Related U.S. Application Data

(60) Provisional application No. 61/108,824, filed on Oct. 27, 2008.

(51) Int. Cl.
 *G06F 3/0482*  (2013.01)
 *G06F 3/0354*  (2013.01)
(52) U.S. Cl.
 CPC ........ *G06F 3/0482* (2013.01); *G06F 3/03542* (2013.01); *G06F 3/03545* (2013.01)
(58) Field of Classification Search
 USPC ....................................... 345/179, 156, 419
 See application file for complete search history.

(56) References Cited

U.S. PATENT DOCUMENTS

| | | | |
|---|---|---|---|
| 5,175,637 A * | 12/1992 | Jones et al. ................. 349/1 |
| 5,631,658 A * | 5/1997 | Gudat et al. ................. 342/457 |
| 6,100,877 A * | 8/2000 | Chery et al. ................. 345/178 |
| 6,297,804 B1 | 10/2001 | Kashitani et al. |
| 7,164,811 B2 * | 1/2007 | Nathanson et al. ........ 382/313 |
| 7,284,866 B2 * | 10/2007 | Buchmann .................. 353/42 |
| 7,292,269 B2 * | 11/2007 | Raskar et al. ............ 348/207.99 |
| 7,903,094 B2 * | 3/2011 | Katsuhito et al. ........... 345/173 |
| 2005/0264525 A1 * | 12/2005 | Adams et al. ............... 345/156 |
| 2007/0180392 A1 | 8/2007 | Russo |
| 2008/0154923 A1 * | 6/2008 | Okuyama ........... G03F 7/70508 |
| 2008/0316212 A1 | 12/2008 | Kushler |
| 2009/0185031 A1 * | 7/2009 | Miyake .............. G06K 9/00476 348/61 |

(Continued)

OTHER PUBLICATIONS

Anoto, "Development Guide for Service Enabled by Anoto Functionality," 2001-2004, Anoto.

(Continued)

*Primary Examiner* — Robin Mishler
(74) *Attorney, Agent, or Firm* — Artegis Law Group, LLP

(57) ABSTRACT

One embodiment of the present invention sets forth a technique for providing an end user with a digital pen embedded with a spatially-aware miniature projector for use in a design environment. Paper documents are augmented to allow a user to access additional information and computational tools through projected interfaces. Virtual ink may be managed in single and multi-user environments to enhance collaboration and data management. The spatially-aware projector pen provides end-users with dynamic visual feedback and improved interaction capabilities.

22 Claims, 18 Drawing Sheets

(56) References Cited

U.S. PATENT DOCUMENTS

2009/0219199 A1   9/2009   Borchert et al.

OTHER PUBLICATIONS

Apitz, et al., "CrossY: A Crossing-Based Drawing Application," ACM UIST '04, p. 1-30.
Arai, et al., "Paperlink: A Technique for Hyperlinking from Real Paper to Electronic Content," ACM CHI '97. p. 327-334.
Arvo, et al., "Fluid Sketches: Continuous Recognition and Morphing of Simple Hand-Drawn Shapes," ACM UIST '00, p. 73-80.
Baudisch, et al., "Halo: a Technique for Visualizing Off-Screen Locations," ACM CHI '03, p. 481-488.
Bier, et al., "Toolglass and Magic Lenses: The See-Through Interface," ACM SIGGRAPH '93, p. 73-80.
Cao, et al., "Interacting with Dynamically Defined Information Spaces using a Handheld Projector and a Pen," ACM UIST '06, p. 225-234.
Cao, et al., "Multi-User Interaction using Handheld Projectors," ACM UIST'07, p. 43-52.
Erwin, Donald E., "Further Evidence for Two Components in Visual Persistence," Journal of Experimental Psychology: Human Perception and Performance, 2(2): p. 191-209, 1976.
Fitzmaurice, George W., Situated Information Spaces and Spatially Aware Palmtop Computers, Communications of the ACM, 1993. 36(7): p. 39-49.
Flagg, et al., "Projector-Guided Painting," ACM UIST'06, p. 235-243.
Flypentop Computer. http://www.flypentop.com/, Nov. 2005.
Forlines, et al., "Zoom-and-Pick: Facilitating Visual Zooming and Precision Pointing with Interactive Handheld Projectors". ACM UIST '05. p. 73-82.
Grossman, et al. "Hover Widgets: Using the Tracking State to Extend the Capabilities of Pen-Operated Devices". ACM CHI'06, p. 861-870.
Guimbretiere, Francois, "Paper Augmented Digital Documents," ACM UIST '03, p. 1-10.
Heikkila, et al., "A Four-step Camera Calibration Procedure with Implicit Image Correction," IEEE CVPR '97, p. 1106-1112.
Heiner, et al., "Linking and Messaging from Real Paper in the Paper PDA," ACM UIST'99, p. 179-186.
Hinckley, et al., "A Survey of Design Issues in Spatial Input," ACM UIST '94, p. 213-222.
Holman, et al., "PaperWindows: Interaction Techniques for Digital Paper," ACM CHI '05, p. 591-599.
Tateno, et al., "A Nested Marker for Augmented Reality," ACM ACM SIGGRAPH '06. 1 page.
Lee, et al., "Haptic Pen: A Tactile Feedback Stylus for Touch Screens," ACM UIST '04, p. 291-294.
Liao, et al., "Pen-top Feedback for Paper-based Interfaces," ACM UIST '06, p. 1-10.
Liao, et al., "PapierCraft: A Gesture-Based Command System for Interactive Paper," ACM Transactions on Computer Human Interaction, 2008, 14(4): p. 1-27.
LiveScribe http://www.livescribe.com/, 2007-2009.
Light Blue Optics http://www.lightblueoptics.com/, 2009.
MacKay et al., "Ariel: Augmenting Paper Engineering Drawings," ACM CHI '95, p. 421-422.
MacKay, et al., "The Missing Link: Augmenting Biology Laboratory Notebooks". ACM UIST '02, p. 41-50.
Perlin, et al., "Nested User Interface Components," ACM UIST '99, p. 11-18.
Phelps, et al., "Multivalent Annotations," Proceedings of ECDL '97.
Signer, et al., "PaperPoint:: A Paper-Based Presentation and Interactive Paper Prototyping Tool," Proceedings of TEI '07, p. 57-64.
Subramanian, et al., "Multi-Layer Interaction for Digital Tables". ACM UIST '06, p. 269-272.
Tsang, et al., "Boom Chameleon: Simultaneous capture of 3D viewpoint, voice and gesture annotations on a spatially-aware display," ACM UIST '02, p. 111-120.
MicroVision, http://www.microvision.com/, 2007.
Wellner, Pierre, "Interacting with Paper on the DigitalDesk," Communications of the ACM, 1993. 36(7): p. 87-96.
Yee, Ka-Ping, "Peephole Displays: Pen Interaction on Spatially Aware Handheld Computers," ACM CHI '03, p. 1-8.
Yeh, et al., "ButtertlyNet: A Mobile Capture and Access System for Field Biology Research". ACM CHI'06, p. 1-10.
Zhai, et al., "Human On-line Response to Target Expansion," ACM CHI '03, p. 177-184.
Final Office Action U.S. Appl. No. 12/537,033, dated Aug. 6, 2012.
Non-Final Office Action U.S. Appl. No. 12/537,033, dated Apr. 12, 2012.
Final Office Action for U.S. Appl. No. 12/537,025, dated Jan. 6, 2014.
Non-Final Office Action for U.S. Appl. No. 12/537,025, dated Sep. 12, 2013.
Non-Final Office Action for U.S. Appl. No. 12/537,025, dated Apr. 23, 2013.
Final Office Action for U.S. Appl. No. 12/537,025, dated Jan. 16, 2013.
Non-Final Office Action for U.S. Appl. No. 12/537,025, dated Aug. 6, 2012.
Non-Final Office Action for U.S. Appl. No. 12/537,025, dated Mar. 22, 2012.
Office Action, U.S. Appl. No. 12/537,033, dated Aug. 6, 2012.

\* cited by examiner

SPATIALLY-AWARE PROJECTION PEN

CROSS-REFERENCE TO RELATED APPLICATIONS

This application claims the priority benefit of U.S. provisional patent application Ser. No. 61/108,824, titled "PEN-LIGHT: COMBINING A MOBILE PROJECTOR AND A DIGITAL PEN FOR DYNAMIC VISUAL OVERLAY," filed Oct. 27, 2008.

BACKGROUND OF THE INVENTION

Field of the Invention

Embodiments of the present invention relate generally to a dynamic visual display and, more specifically, to a spatially-aware projection pen device.

Description of the Related Art

In recent years, digital pens that capture the ink strokes made on physical paper have become widely available. These devices combine the versatility and simplicity of paper with digital enhancements such as the capture and recording of annotations. Special paper that includes pre-printed commands may be used to provide a command interface that allows the pen-user to specify commands that control the digital pen.

A challenge with such systems is that while the pen provides the end-user with rich and dynamic input capabilities through the creation of ink and command strikes, current digital pen devices have very limited output capabilities. Some digital pens have been enhanced with various forms of feedback including auditory, visual, and haptic feedback. The visual feedback is limited to what can be displayed on the barrel of the pen using colored LEDs or small OLED displays. While such displays may be suitable for basic digital pen operations, e.g. querying simple text, these displays are not well-suited for more complex interactions, e.g., searching for a word or object within a document.

As the foregoing illustrates, what is needed in the art is a technique for providing end-users with improved visual output in digital pen systems.

SUMMARY OF THE INVENTION

One embodiment of the present invention sets forth a spatially-aware projection pen system. The system includes an input mechanism, a position tracking mechanism, a memory, a projector, a processor, and an enclosure. The input mechanism is configured to be activated and deactivated by a user and the position tracking mechanism is configured to determine a position of the spatially-aware projection pen within a three-dimensional space. The memory is configured to store design data and image data. The projector is configured to display a projected image on a display surface, where the projected image includes at least a portion of the design data and/or at least a portion of the image data. The processor is configured to receive input signals from the input mechanism and the position tracking mechanism and output the projected image to the projector for display based on the input signals and the position of the spatially-aware projection pen. The enclosure is configured to be grasped by a human hand and house the input mechanism, the position tracking mechanism, the memory, the projector, and the processor.

One advantage of the disclosed method is that it allows an end-user to access additional information and computational tools through projected interfaces when viewing a paper document. Virtual ink may be managed in single and multi-user environments to enhance collaboration and data management. The spatially-aware projector pen provides end-users with dynamic visual feedback and improved interaction capabilities, thereby improving the overall end-user experience.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
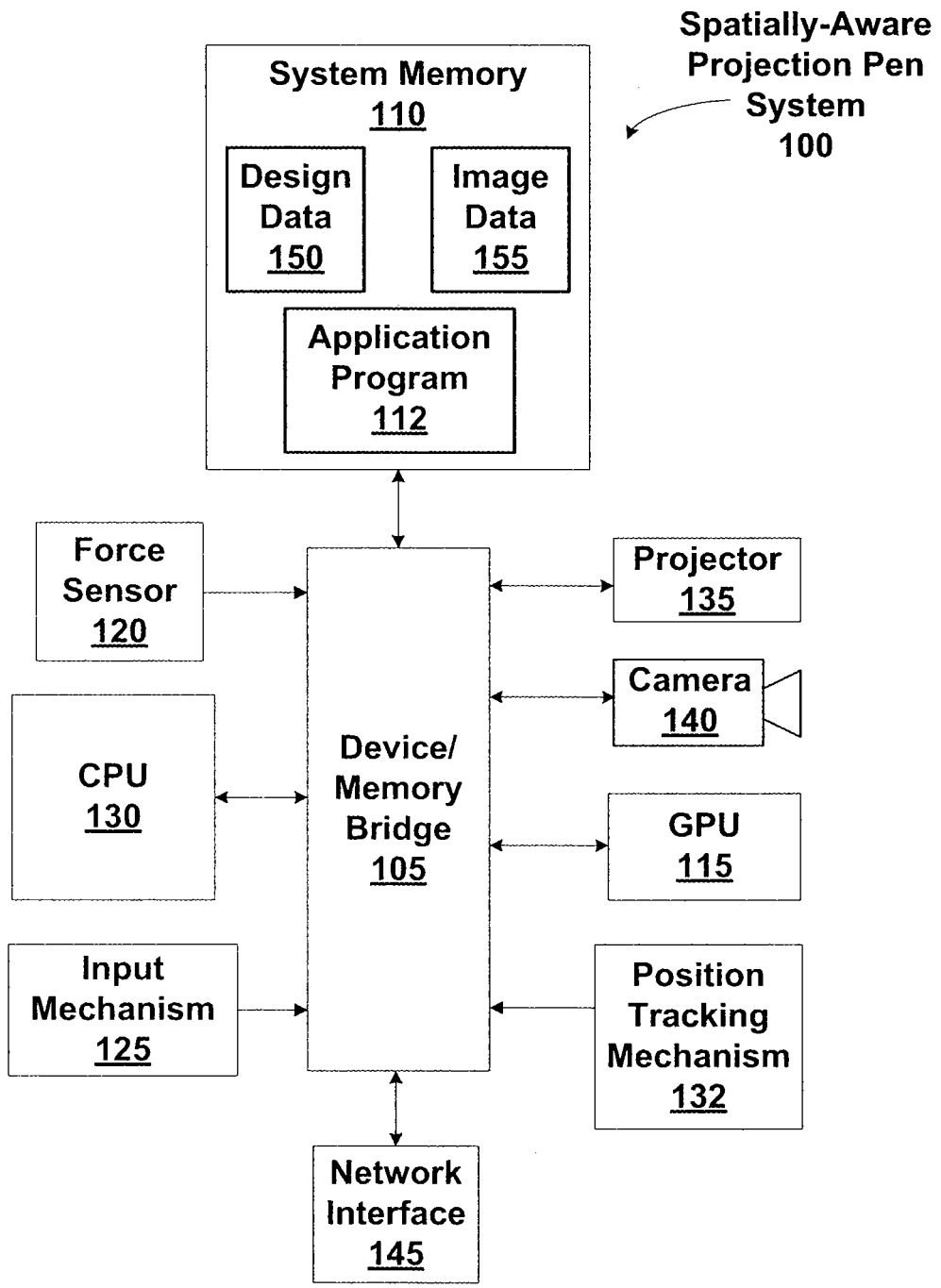
FIG. 1 illustrates a spatially-aware projection pen system configured to implement one or more aspects of the present invention.

FIG. 1 illustrates a spatially-aware projection pen system 100 configured to implement one or more aspects of the present invention. The spatially-aware projection pen system 100 includes, without limitation, a central processing unit (CPU) 130, a system memory 110, a graphics processing unit (GPU) 115, a device/memory bridge 105, a projector 135, a camera 140, a force sensor 120, a network interface 145, an input mechanism 125, and a position tracking mechanism 132. The various components of the spatially-aware projection pen system 100 are packaged within an enclosure to form a spatially-aware projection pen that is configured to be grasped by the human hand. The CPU 130 communicates with the system memory 110 via the device/memory bridge 105, which may be, e.g., a Northbridge device or subsystem. System memory 110 is configured to store application programs, as well as data used by or generated by the CPU 130. In particular, system memory 110 is configured to store design data 150, such as computer-aided design drawings and information that is accessed by the application program 112. System memory 110 is also configured to store image data 155 for display by the projector 135. The image data 155 may be produced by the CPU 130 or a discrete GPU 115 based on design data 150 and/or data received via the camera 140, position tracking mechanism 132, force sensor 120, and/or input mechanism 125.

System memory 110 is coupled to the device/memory bridge 105 via a system memory bus 150. The device/memory bridge 105 may be coupled to the GPU 115 that incorporates real-time image rendering means for rendering both three-dimensional (3D) and two-dimensional (2D) images. The CPU 130 or GPU 115 delivers pixel data to projector 135. In some embodiments, the integrated circuit implementing the CPU 130 may incorporate additional functional blocks, such as the device/memory bridge 105 and GPU 115.

The device/memory bridge 105 is coupled to the network interface 144, the force sensor 146, the input mechanism 125, the position tracking mechanism 132, the projector 135, and the camera 140. The network interface 144 provides network connectivity to other computers in local or remote locations using any suitable technology, preferably a wireless technology. In particular, portions of design data 150 and image data 155 may be output to remote users via the network interface 144. Similarly, data received from a remote user via the network interface 144 may be displayed and/or stored as design data 150 or image data 155.

Other components (not explicitly shown), including USB or other port connections, CD drives, DVD drives, film recording devices, and the like, may also be connected via network interface 145. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, Quick Path Interconnect, or any other bus or point-to-point communication protocol(s), and connections between different devices may use different protocols as is known in the art.

In one embodiment, system memory 110 is configured to store a graphics modeling or authoring application program 112 that is configured to access the design data 150 to provide image data 155 for display via projector 135 and use information acquired by the force sensor 120, the input mechanism 125, the position tracking mechanism 132, and the camera 140 to display a user-interface or image data. The force sensor 120 indicates when a tip of the spatially-aware projection pen is in contact with a physical surface and may be used to record pen strokes. An ink reservoir may be configured to deposit physical ink on the display surface when the tip of the spatially-aware projection pen is in contact with the display surface. The input mechanism 125 may be implemented using a button, wheel, or the like, that is configured to be activated and/or deactivated by a user. The position tracking mechanism 132 indicates the position of the spatially-aware projection pen in three-dimensional space relative to a surface, e.g., paper. The position tracking mechanism 132 may be configured to sense full, six degree-of-freedom information.

The camera 140 may be used capture pen strokes and/or perform two-dimensional tracking by reading a small high-resolution pattern that is physically printed on the display surface. The use of patterns for two-dimensional orientation and tracking is a technique that is familiar to those skilled in the art. Pen strokes that are captured using any combination of force sensor 120, the input mechanism 125, the position tracking mechanism 132, and the camera 140 may be stored as image data 155 and displayed by projector 135 as virtual ink in real-time. The camera 140 may be used to capture pen strokes that deposit physical ink and store the pen strokes as image data 155.

Figure 2A:
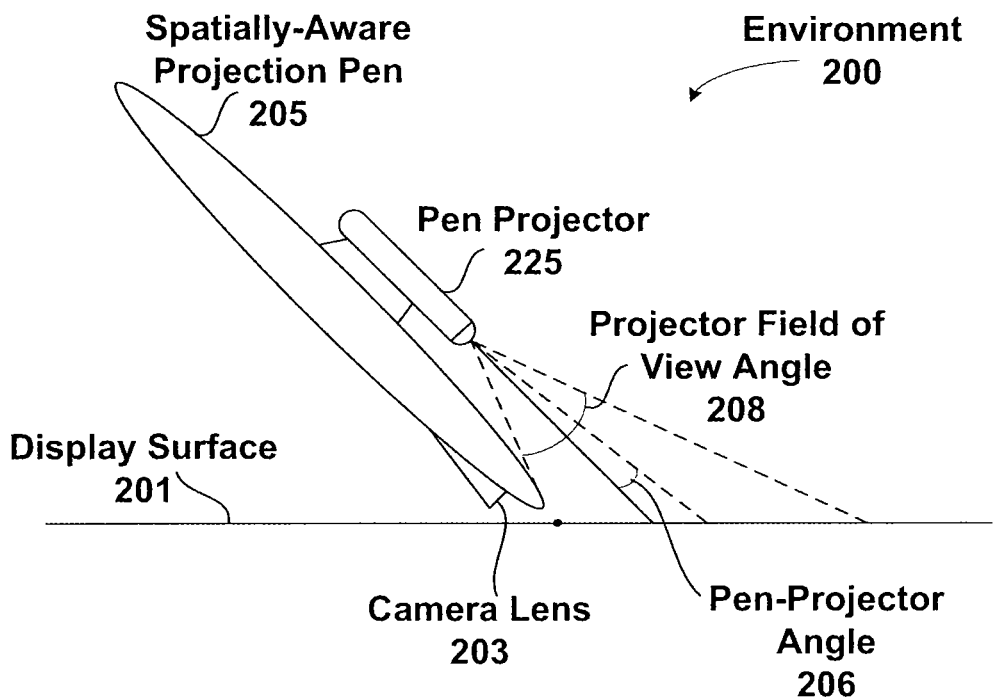
FIG. 2A illustrates a spatially-aware projection pen in an environment, according to one embodiment of the invention.

FIG. 2A illustrates a spatially-aware projection pen 205 in a system 200, according to one embodiment of the invention. One or more of the elements illustrated in spatially-aware projection pen system 100 are included in the spatially-aware projection pen 205. In order for the pen projector 225 to display the design data 150 and/or image data 155 as a visual overlay in the context of a paper document, the application program 112 needs to be aware of the spatial location relative to the display surface 201. Capturing the 3D location of the pen tip on or above the display surface 201 allows the spatially-aware projection pen 205 to display virtual information which is relevant to the existing physical content on the paper. The virtual information may be read from design data 150 or information previously captured by spatially-aware projection pen 205 from pen strokes that is stored as image data 155. The spatially-aware projection pen 205 increases the user's ability to work with functionality that requires visual feedback, such as viewing the results of computations, and overlaying contextual information using pen projector 225.

In one embodiment, the pen projector 225 is positioned 1 cm above and 5 cm away from the tip of spatially-aware projection pen 205. The pen-projector angle 206 is 7 degrees, and the projector field of view angle 208 is 30 degrees with an aspect ratio of 4/3. This configuration creates a 2.5 cm×2.5 cm projected image when the tip of the spatially-aware projection pen 205 is 5 cm above the display surface 201. In other embodiments, the pen projector 225 position, the projector field of view angle 208, and/or the pen-projector angle 206 may vary.

A camera lens 203 is positioned to enable 2D tracking using patterns printed on the display surface 201. The camera lens 203 may also be used to enable 3D optical tracking using traceable patterns to retrieve camera calibration parameters to determine 3D location and orientation. The patterns may also represent a hierarchical encoding pattern which allows the camera to cover a wide range of distances from the display surface 201. Additional patterns may be printed on the display surface 201 in infrared ink to be less distracting to the user.

Figure 2B:
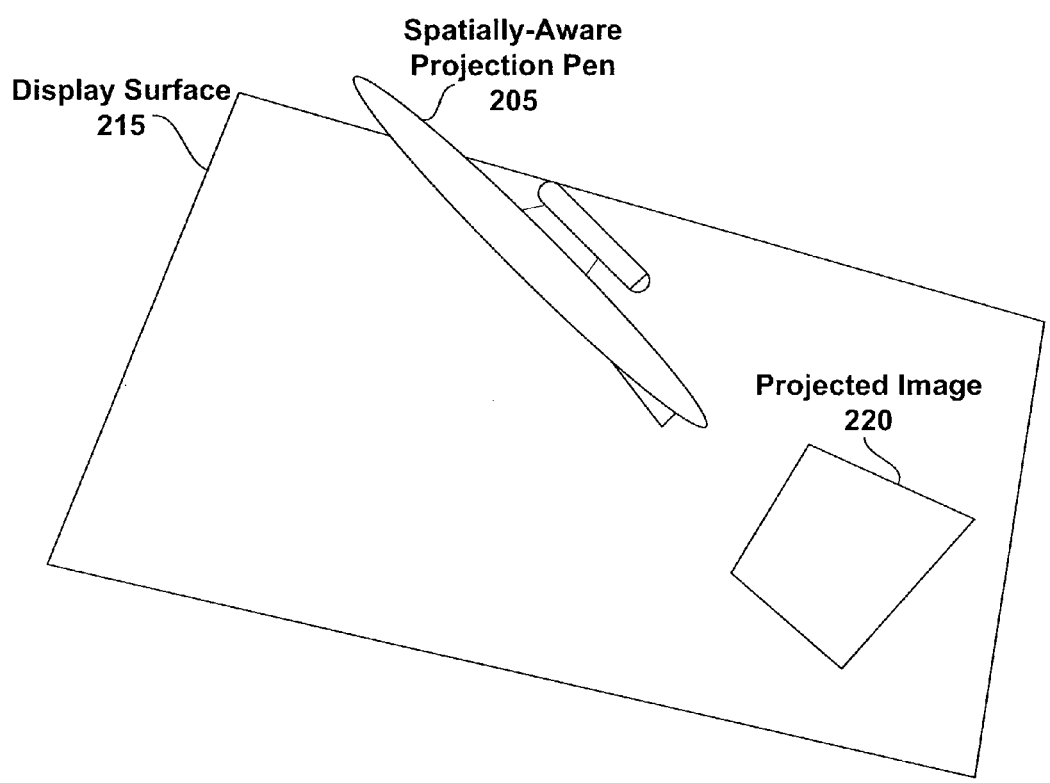
FIG. 2B illustrates a spatially-aware projection pen producing a projected image, according to one embodiment of the invention.

FIG. 2B illustrates the spatially-aware projection pen 205 producing a projected image 220 on a display surface 215, according to one embodiment of the invention. The location of the pen projector 225 should be carefully considered, since the location affects the operation of the overall system in several ways. The location of the pen projector 225 within the spatially-aware projection pen 205 determines the size of the projected image 220 and the center of mass of the spatially-aware projection pen 205. Furthermore, the pen-projector angle 206 determines where the tip of the spatially-aware projection pen 205 is in reference to the projected image 220. Hence, any technique that requires the user to rely on visual persistence to interact with virtual imagery, such as tracing, will be affected by the location of the pen projector 225. The pen-projector angle 206 may also determine if any "finger shadows" exist on the projected image 220.

In some embodiments, a laser based projection is used to keep the projected image 220 in constant focus at different distances from the spatially-aware projection pen 205. The dynamic brightness may also be accommodated, using a projector that modulates the brightness based on the distance of the spatially aware pen 205 from the display surface 215 and rendering software that takes the dynamic dots per inch (DPI) into account. In other embodiments, a separate projector configuration, such as a display surface mounted projector or even a removable "pen cap projector" are used.

Conventional digital pens without an integrated projector are not able to display query results or other information on the display surface 215 at different sizes and resolution. The size of projected image 220 may vary dynamically, based on the location of spatially-aware projection pen 205 relative to the display surface 215. Spatially-aware projection pen 205 also provides a direct link between input, e.g., pen strokes, and output, e.g., projected image 220. This coupling between the input and output enables a variety of different interaction techniques since the input and output features of the spatially-aware projection pen 205 may be used simultaneously. Additionally, multiple users may share the same display surface 215 and collaborate by each providing input via a spatially-aware projection pen 205. Remote users may also provide input and see the same projected image 220 on a remote display surface 215.

Figure 2C:
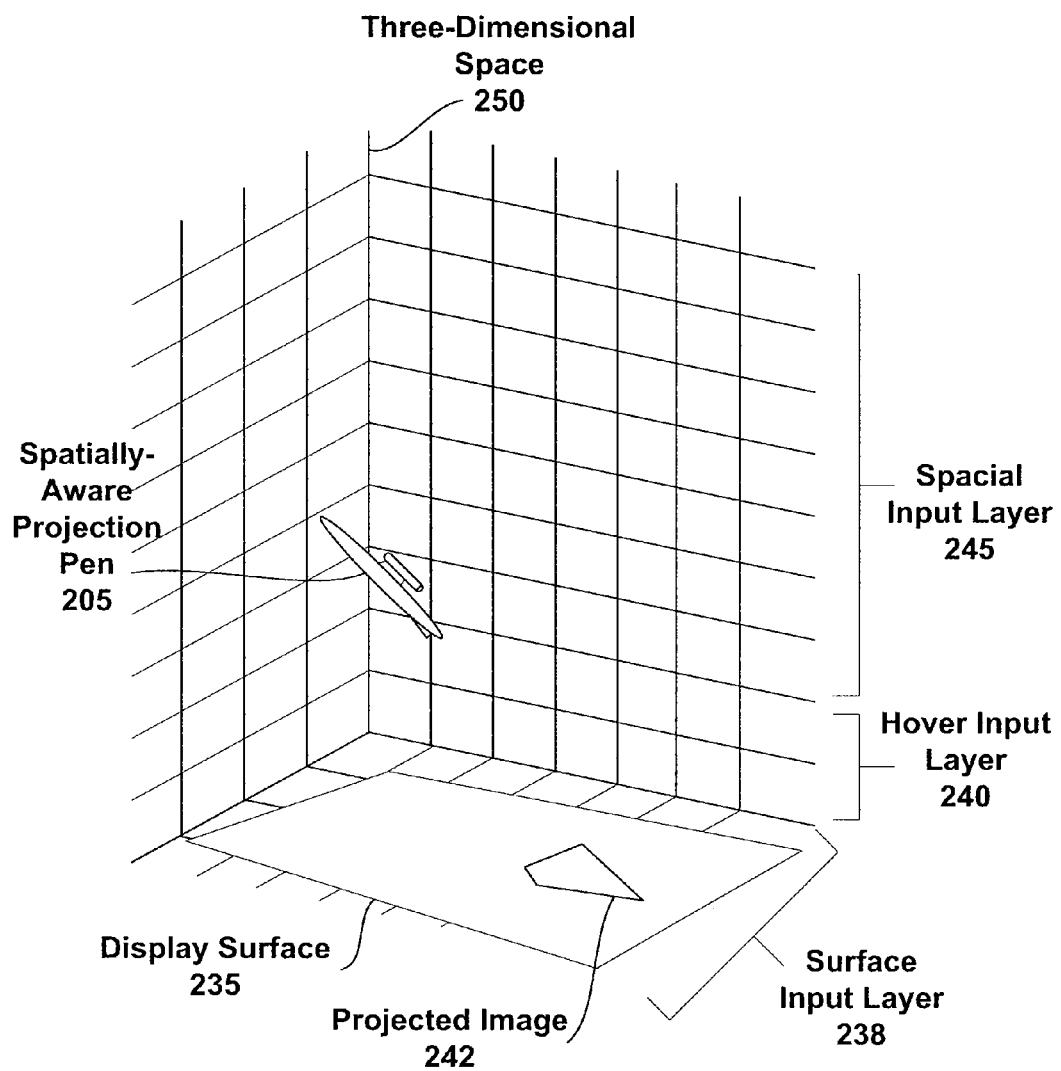
FIG. 2C illustrates the different input layer regions in a three-dimensional space that includes the spatially-aware projection pen, according to one embodiment of the invention.

FIG. 2C illustrates the different input layer regions in a three-dimensional space 250 that includes the spatially-aware projection pen 205, according to one embodiment of the invention. The spatially-aware projection pen 205 enables multiple input and display layers that enable new interaction techniques and provide richer visual feedback compared with interacting with paper. Users may navigate between different virtual ink and content layers, perform operations on physical and virtual content, extract and display different representations of the printed content on the display surface 235, and access functionality through a menu system that is displayed by the spatially-aware projection pen 205 in the projected image 242.

The three-dimensional space 250 is partitioned into multiple input layers and display layers. A surface input layer 238 is located coincident with the display surface 235, a hover input layer 245 is located just above the display surface 235, and a spatial input layer 245 exists in the three-dimensional space 250 above the hover input layer 240. The spatial awareness of the spacially-aware pen 205 enables above-the surface interaction within the spatial input layer 245. The main use of the spatial input layer 245 is for command input and to position or rescale the projected image 242. The primary use of the hover input layer 240 is for command input and manipulation of a virtual cursor within the projected image 242.

The surface input layer 238 is where the tip of the spatially-aware projection pen 205 is in physical contact with the display surface 235. The visibility characteristic of the surface input layer 238 indicates whether or not input within the layer will produce a visible trail of ink. With a standard physical pen, this input is visible. However, it may be desirable to provide input on the display surface 235 without leaving a trail of ink. For example, when providing command input, an ink trail which was used for selection is of no use after the menu item is selected. Also, it may be useful to support virtual ink annotations created on top of the original of a physical image, to avoid undesirable clutter, and to preserve the original. Virtual ink can be created by mechanically switching, either manually or electronically, to a pen tip without ink or by placing a transparency on top of the paper. Since the spatially-aware projection pen 205 captures the content that has been created and tracks the position within three-dimensional space 250, input created in surface input layer 238 can be either high level global system commands, or contextual, acting on the data which is in proximity to the input.

Figure 2D:
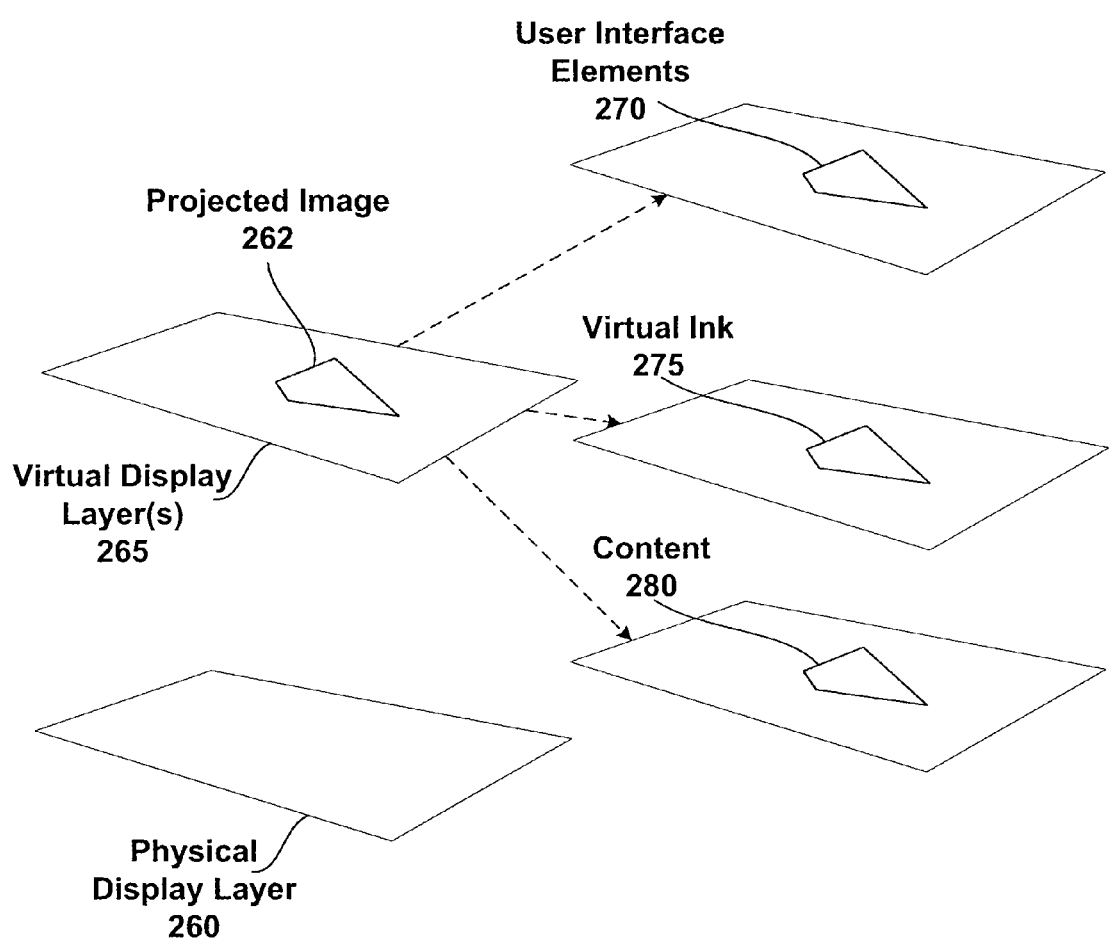
FIG. 2D illustrates the different input layers, according to one embodiment of the invention.

FIG. 2D illustrates the different display and virtual layers, according to one embodiment of the invention. The display layers include the physical display (surface) layer 260 and the virtual display layer(s) 265. The virtual display layers 268 may include multiple separate virtual layers that are overlaid. Each virtual layer may include one or more of user interface elements 270, virtual ink 275, or data content 280. The physical display layer 260 is the layer which physically exists on the display surface 235 and may include a variety of different elements. Examples of elements include printed content, such as a diagram or two-dimensional building layout, ink created by the user, and user interface elements, such as menus and icons, preprinted on the physical display layer 260.

Above the physical display layer 260 are one or more virtual display layers 265 that may be combined to produce the projected image 262. A variety of display elements may be projected onto the virtual display layers 262. Two traditional forms of display elements include the user interface elements 270 and the user generated virtual ink 275. A third form of display element is auxiliary data content 280 stored as part of design data 150. Auxiliary data content 280 is not explicitly created by the user with the spatially-aware projection pen 205. Often, only a subset of associated design data 150 and/or image data 155 is transferred to the physical display layer 260 during the printing process. Data content 280 may be useful for displaying aspects of the design data 150 that are not included in the physical display layer 260. For example, when multivalent documents that consist of multiple abstract layers of distinct, but closely coupled content, are used only some of the abstract layers may be included in physical layer 260. Multivalent documents are especially prevalent in the application domain of architecture and three-dimensional modeling, e.g., different floor plans, section views, and additional metadata to describe materials and processes.

The most basic functionality of digital pens and the spatially-aware projection pen 205 is creating virtual and/or physical ink. The spatially-aware projection pen 205 enables users to create and manage virtual ink that users can then make use of in different functions, such as tracing and drawing virtual guides. In some embodiments, the input mechanism 125 is used to change from a pen tip with physical ink to a pen tip using virtual ink that is displayed within the projected image 262. When virtual ink is enabled, all pen strokes are added to the virtual ink display layer 265, in the location of the display surface in which they are created. The virtual ink 275 may be stored in image data 155 or design data 150. By creating the strokes in the surface input layer 238, the annotations are added to only the virtual display layer 265. This allows a user to annotate a blueprint without altering the original document.

Users can trace over both physical and virtual content within projected image 262 to produce trace data that is captured and stored in image data 155. The trace data may be applied to different special locations within three-dimensional space 250. Users may also load existing virtual templates to trace out with physical ink input. The resolution and size of the virtual content being traced changes in resolution and size depending on the location of the spatially-aware projection pen 205 relative to the display surface 235.

Instead of tracing, virtual guides may be created to aid in generating a physical sketch. Such grids and guides are widely used in image editing applications, but unavailable when working on physical paper. To create a geometric guide, the user can select the line circle, rectangle, or grid menu item. Instead of entering points that define the geometry, the user may draw a similar shape and the spatially-aware projection pen 205 will approximate the selected shape. For example, the user can draw a circle using the spatially-aware projection pen 205 in the three-dimensional space 250, and the spatially-aware projection pen 205 determines the center point and the radius. In grid mode, users may draw a rectangle that serves as the unit rectangle shape of the grid. Once the spatially-aware projection pen 205 is lifted, the entire virtual layer is covered with a self replicating grid layout.

Figure 3A:
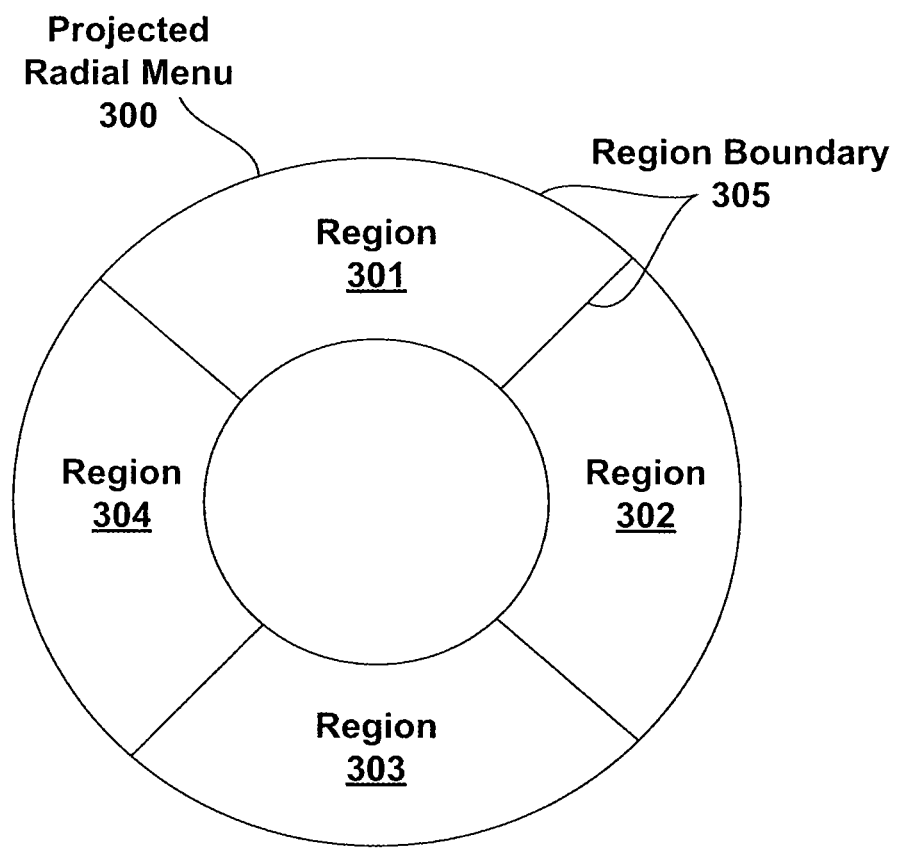
FIG. 3A illustrates a projected radial menu that is produced by the spatially-aware projection pen, according to one embodiment of the invention.

FIG. 3A illustrates a projected radial menu 300 that is produced by the spatially-aware projection pen 205, according to one embodiment of the invention. The projected radial menu 300 may be implemented using hierarchy to access various functions of the system 200. The radial distribution of menu items in regions 301, 302, 303, and 304 that are separated by region boundaries, e.g., region boundary 305, simplifies use of the projected radial menu 300 since users only need to remember what direction to move towards. Users can access the projected radial menu 300 by activating the input mechanism 125 on spatially-aware projection pen 205 to cause the top level of the projected radial menu 300 to be displayed in a virtual display player 265. In contrast, conventional digital pen menu systems rely on menus that are preprinted on the display surface.

Projected radial menu 300 may be configured to display different levels of hierarchy. The semantic scale of the projected radial menu 300 may vary depending on the position of the spatially-aware projection pen 205 in the three-dimensional space 205. For example, when the user lifts the spatially-aware projection pen 205 above the hover input layer 240, two levels of menu items may be shown by subdividing each of the regions 301, 302, 303, and 304, thereby allowing the user to see more items at the same time. Although the projected image 242 appears larger as the spatially-aware projection pen 205 moves further from the display surface 235, the motor space is smaller, making selection of one of regions 301, 302, 303, or 304 more difficult.

Different metaphors may be used for displaying the virtual display layers 365 and the projected radial menu 300. A first metaphor is "content locked on-surface" that displays the content on the display surface 235 and the projected image 242 appears as a peephole through which the content is visible. The content is stationary relative to the spatially-aware projection pen 205 since it is in a position that is locked to the display surface 235. The virtual content is overlaid in the context of the display surface 235. For example, ink annotations made by a remote collaborator and captured as virtual ink are positioned on top of the content to which they are referring, or virtual content that augments the physical content may be registered with the printed content and be overlaid on the display surface 235.

A second metaphor is "content locked in-hand" that generates projected image 242 without any calibration or transformation. The pen projector 225 does not need to be spatially aware when this display mode is used. This mode is also useful when the user wants to change the position or scale of the content as the spatially-aware projection pen 205 moves.

Figure 3B:
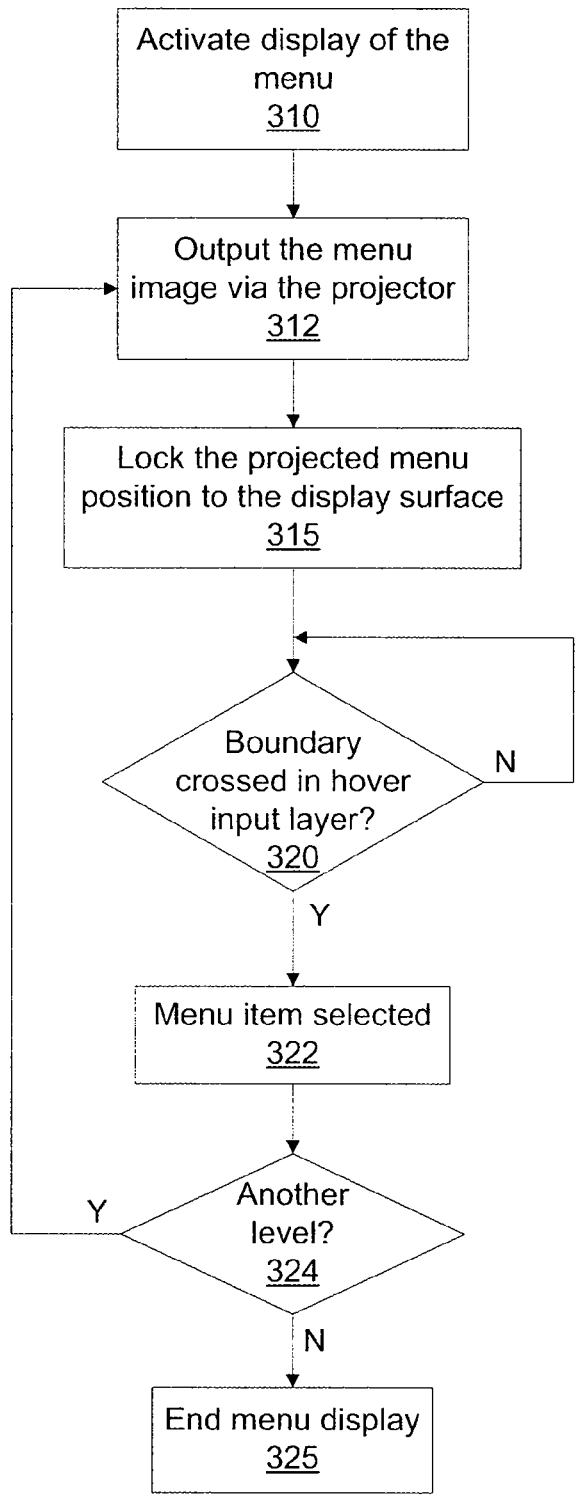
FIG. 3B illustrates a flow diagram of method steps for displaying the projected radial menu, according to one embodiment of the invention.

FIG. 3B illustrates a flow diagram of method steps for displaying the projected radial menu 300, according to one embodiment of the invention. Although the method steps are described in conjunction with FIGS. 1 and 2A, persons skilled in the art will understand that any system configured to perform the method steps, in any order, falls within the scope of the present invention.

The method begins at step 310 where the user activates display of the projected radial menu 300 using the input mechanism 125 on the spatially-aware projection pen 205, i.e., by pressing and releasing a button. At step 312, the projected radial menu 300 is output via the pen projector 225 to produce projected image 242. At step 315, the projected radial menu 300 is locked in position onto the display surface 235 and a virtual cursor is positioned in the center of the projected radial menu 300. The virtual cursor is locked to the spatially-aware projection pen 205 and moves with the spatially-aware projection pen 205. At step 320, the spatially-aware projection pen 205 determines whether the virtual cursor crosses a region boundary that delineates one of the regions 301, 302, 303, and 304 while the spatially-aware projection pen 205 is positioned in the hover input layer 240.

The method remains at step 320 when a region boundary is not crossed. Otherwise, at step 322, the item, specified by the region 301, 302, 303, or 304 that is entered when the region boundary is crossed, is selected. At step 324, the spatially-aware projection pen 205 determines whether another level of hierarchy of the projected radial menu 300 should be displayed. If so, then the method returns to step 312. Another level of hierarchy should be displayed when the selected item is hierarchical, i.e., includes more than one option. Otherwise, at step 325, the spatially-aware projection pen 205 ends display of the projected radial menu 300. The projected image 242 remains locked to the position on the display surface 235 while the projected radial menu 300 is activated and the spatially-aware projection pen 205 is configured in the locked on-surface mode. This allows the user to move the spatially-aware projection pen 205 relative to the regions in order to cross a region boundary and select a particular region. Note that the locked-on surface mode may be selected by navigating the projected radial menu 300.

Figure 3C:
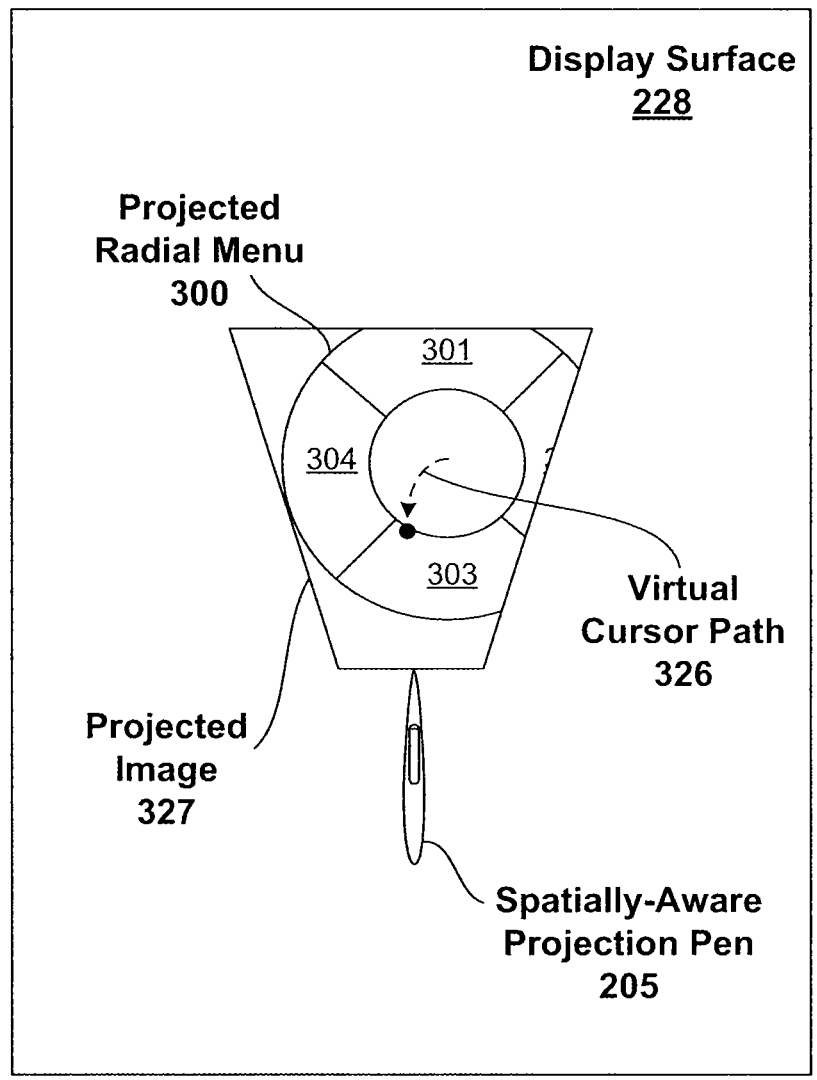
FIG. 3C illustrates a projected radial menu that is locked-onto the display surface, according to one embodiment of the invention.

FIG. 3C illustrates the projected radial menu 300 that is locked-onto the display surface 228, according to one embodiment of the invention. Although the method steps are described in conjunction with FIGS. 1 and 2A, persons skilled in the art will understand that any system configured to perform the method steps, in any order, falls within the scope of the present invention. The projected image 327 output by the spatially-aware projection pen 205 provides a peephole into the projected radial menu 300. As the virtual cursor path 326, which is controlled by movement of the spatially-aware projection pen 205, crosses the region boundary that delineates region 303, the menu item specified by region 303 is selected. The spatially-aware projection pen 205 is then configured for an operation based on the selected menu item.

Figure 3D:
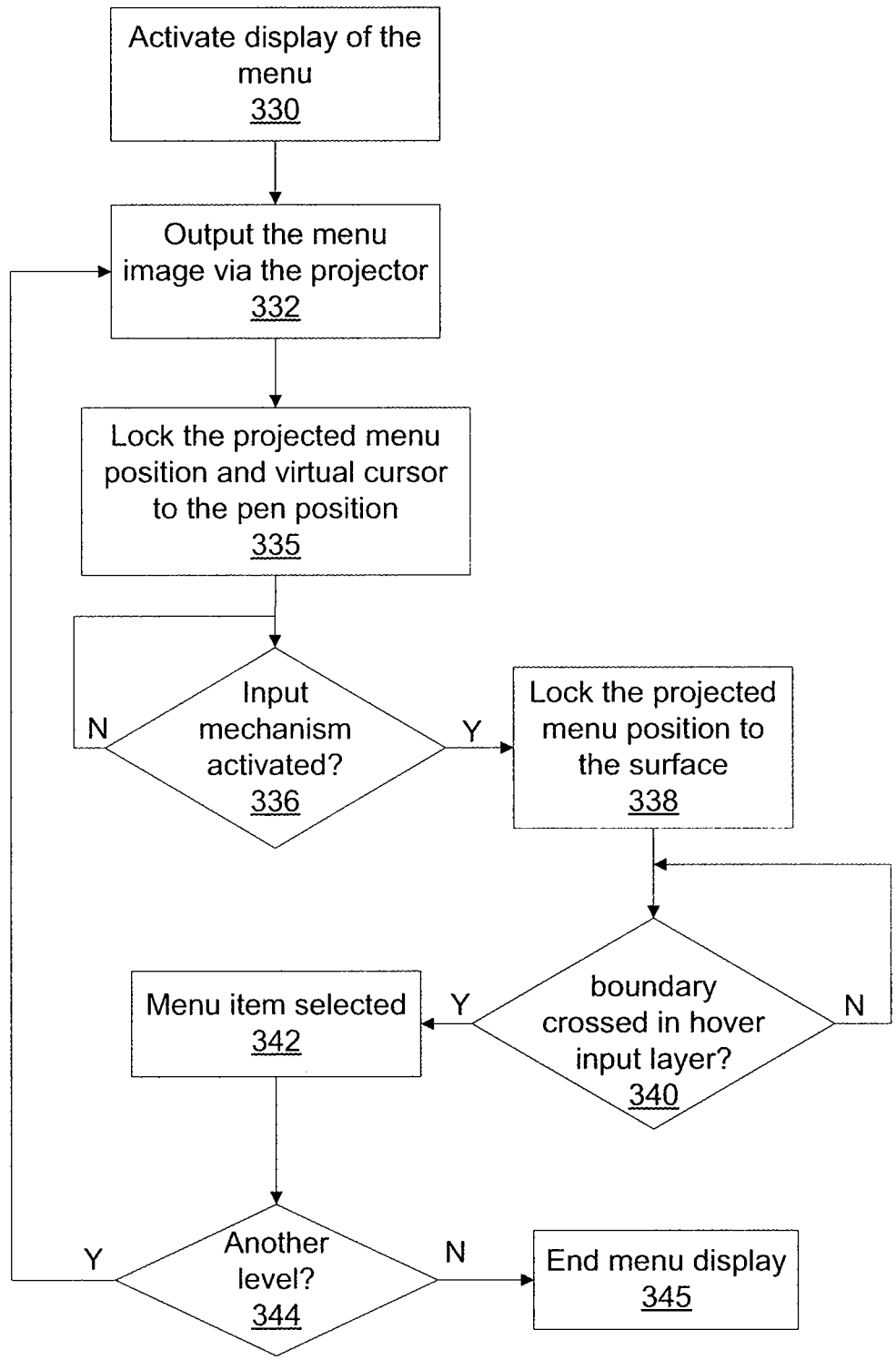
FIGS. 3D and 3E illustrate other flow diagrams of method steps for displaying the projected radial menu, according to one embodiment of the invention.

FIG. 3D illustrates another flow diagram of method steps for displaying the projected radial menu 300, according to one embodiment of the invention. Although the method steps are described in conjunction with FIGS. 1 and 2A, persons skilled in the art will understand that any system configured to perform the method steps, in any order, falls within the scope of the present invention.

The method begins at step 330, where the user activates display of the projected radial menu 300 using the input mechanism 125. At step 332, the projected radial menu 300 is output via the pen projector 225 to produce projected image 242. At step 335, the projected radial menu 300 is locked to the position of the spatially-aware projection pen 205, i.e., the projected radial menu 300 moves with the spatially-aware projection pen 205. The virtual cursor is also locked to the position of the spatially-aware projection pen 205 and appears at the center of the projected radial menu 300. Menu items cannot be selected by crossing a region boundary because the virtual cursor remains in the center of the projected radial menu 300 when the user moves the spatially-aware projection pen 205.

At step 336, the spatially-aware projection pen 205 determines whether the input mechanism 125 is activated. If so, then at step 338 the projected image 242 is locked to the display surface 228. Otherwise, the method remains at step 336. At step 340, the spatially-aware projection pen 205 determines whether or not a region boundary that delineates one of the regions 301, 302, 303, and 304 is crossed while the spatially-aware projection pen 205 is positioned in the hover input layer 240 and the input mechanism 125 is activated. In other words, to complete steps 336, 338, and 340 the user depresses a button on the spatially-aware projection pen 205 and gestures in the direction of the region that specifies the menu item to be selected. The spatially-aware projection pen 205 remains in step 340 when a region boundary is not crossed. Otherwise, at step 342, the item, specified by the region 301, 302, 303, or 304 that is entered when the region boundary is crossed, is selected. The user may release the button when the menu item is selected.

At step 344, the spatially-aware projection pen 205 determines whether another level of hierarchy of the projected radial menu 300 should be displayed. If so, then the method returns to step 332. Otherwise, at step 345, the spatially-aware projection pen 205 stops displaying the projected radial menu 300. The projected image 242 remains locked to the position of the display surface 228. The spatially-aware projection pen 205 is then configured for an operation based on the selected menu item. Note that the locked in-hand mode or the locked to-surface mode may be activated by navigating the projected radial menu 300.

Figure 3E:
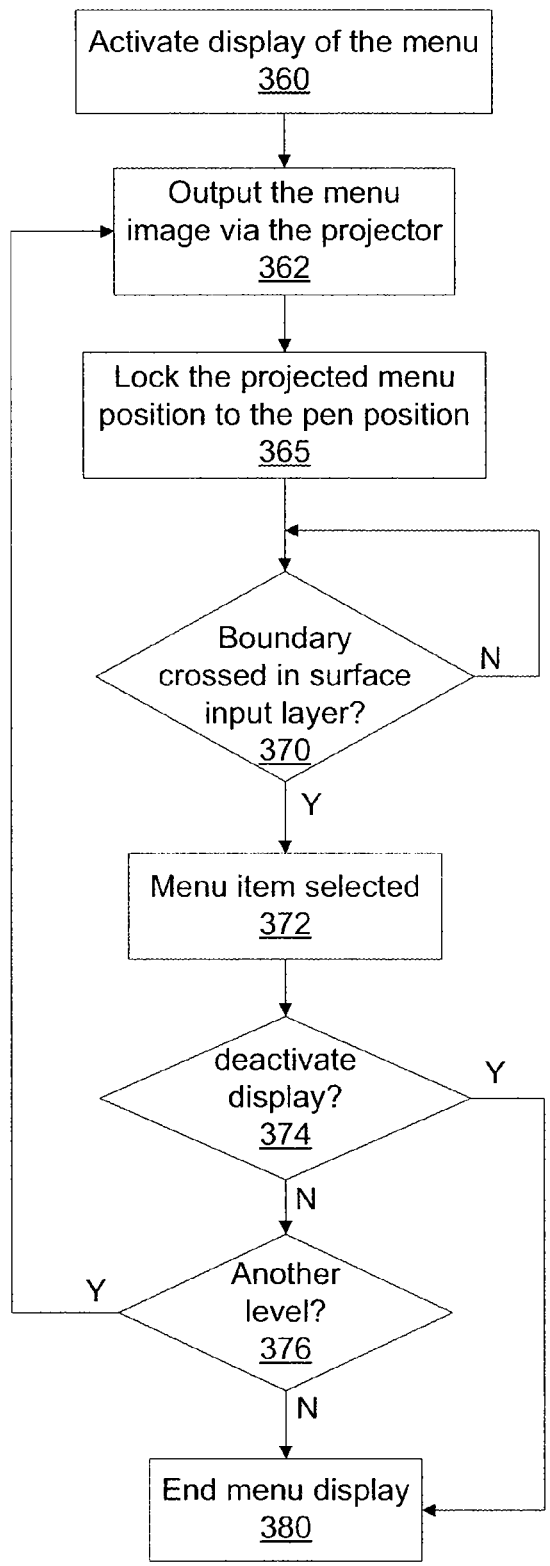

FIG. 3E illustrates another flow diagram of method steps for displaying the projected radial menu 300 using another variation of the locked in-hand mode, according to one embodiment of the invention. Although the method steps are described in conjunction with FIGS. 1 and 2A, persons skilled in the art will understand that any system configured to perform the method steps, in any order, falls within the scope of the present invention.

The method begins at step 360 where the user activates display of the projected radial menu 300 using the input mechanism 125. At step 362, the projected radial menu 300 is output via the pen projector 225 to produce projected image 242. At step 365, the projected radial menu 300 is locked to the position of the spatially-aware projection pen 205, i.e., the projected radial menu 300 moves with the spatially-aware projection pen 205. The virtual cursor is also locked to the position of the spatially-aware projection pen 205 and appears at the center of the projected radial menu 300. Menu items cannot be selected by crossing a region boundary because the virtual cursor remains in the center of the projected radial menu 300 when the user moves the spatially-aware projection pen 205.

At step 370, the spatially-aware projection pen 205 determines whether a region boundary delineating one of the regions 301, 302, 303, and 304 is crossed while the spatially-aware projection pen 205 is positioned in the surface input layer 238. When this technique of menu item selection is used, ink trails (virtual or physical) may be made on the display surface 235. The method remains in step 370 when a region boundary is not crossed. Otherwise, at step 372, the menu item, specified by the region 301, 302, 303, or 304 that is entered when the region boundary is crossed, is selected.

At step 374, the spatially-aware projection pen 205 determines if the displaying of the projected radial menu 300 should be deactivated. If so, then the method proceeds directly to step 380. In some embodiments, the user may deactivate the displaying of the projected radial menu 300 by depressing and releasing the input mechanism 125 or by lifting the spatially-aware projection pen 205 above the surface input layer 238.

If, at step 374, the spatially-aware projection pen 205 determines that the displaying of the projected radial menu 300 should not be deactivated, then, at step 376, the spatially-aware projection pen 205 determines whether another level of hierarchy of the projected radial menu 300 should be displayed. If another level of hierarchy of the projected radial menu 300 should be displayed, then the method returns to step 362. Otherwise, at step 380, the spatially-aware projection pen 205 stops displaying the projected radial menu 300. The spatially-aware projection pen 205 is then configured for an operation based on the selected menu item. The projected image 242 remains locked to the position of the spatially-aware projection pen 205 while the spatially-aware projection pen 205 is configured in the locked in-hand mode. Note that the locked in-hand mode or the locked on-surface mode may be activated by navigating the projected radial menu 300.

When the locked in-hand mode is used, it may be desirable to use an image stabilization technique since the projected image 242 moves with any movement of the spatially-aware projection pen 205. One technique that may be used involves updating the projected image 242 at fixed intervals in time or at discrete intervals, such as when the spacially-aware pen 205 is in a relatively stable position. Once the spatially-aware projection pen 205 begins moving faster than a threshold velocity value, the projected image 242 may fade out, i.e., become increasingly transparent. This introduces a unique interaction characteristic, specifically that the user may be able to see the virtual imagery when holding the spatially-aware projection pen 205 in a stable position, but the user relies on his or her persistence of vision to interact with the projected image 242 when moving the spatially-aware projection pen 205.

Professions such as architecture rely on a paper intensive workflow to distribute designs among different parties and to represent the actual contract commitment. While paper drawings are ubiquitous in each stage of architecture practice, the usefulness of paper drawings is somewhat limited. In particular, it is difficult to access additional information related to the paper drawings. During a discussion between architects and their clients in a meeting room, oftentimes the clients want to see a three-dimensional rendering of the design. This normally requires a computer nearby and real-time applications to simulate the walk-through. Another limitation of conventional paper drawings is that levels of detail are spread across many different pages. Manually tracing one layer of information from one page of a paper drawing onto a sheet (typically onionskin paper) and overlaying that sheet on top of another page of a paper drawing is a common practice that architects use to compensate for this limitation. It is also difficult to coordinate different versions of a design document between different service providers and clients as well as between remote collaborators.

The spatially-aware projection pen is particularly useful for workflows that are paper-based and use complex designs with multiple layers or contexts. In particular, with the spatially-aware projection pen, users can interact with different layers, access design data, and capture design changes and other input. Importantly, users can query and augment physical architectural sketches and collaborate with remote users. Thus, the spatially-aware projection pen addresses many of the problems set forth above that arise from complex, paper-based workflows that include multiple layers or contexts.

Figure 4A:
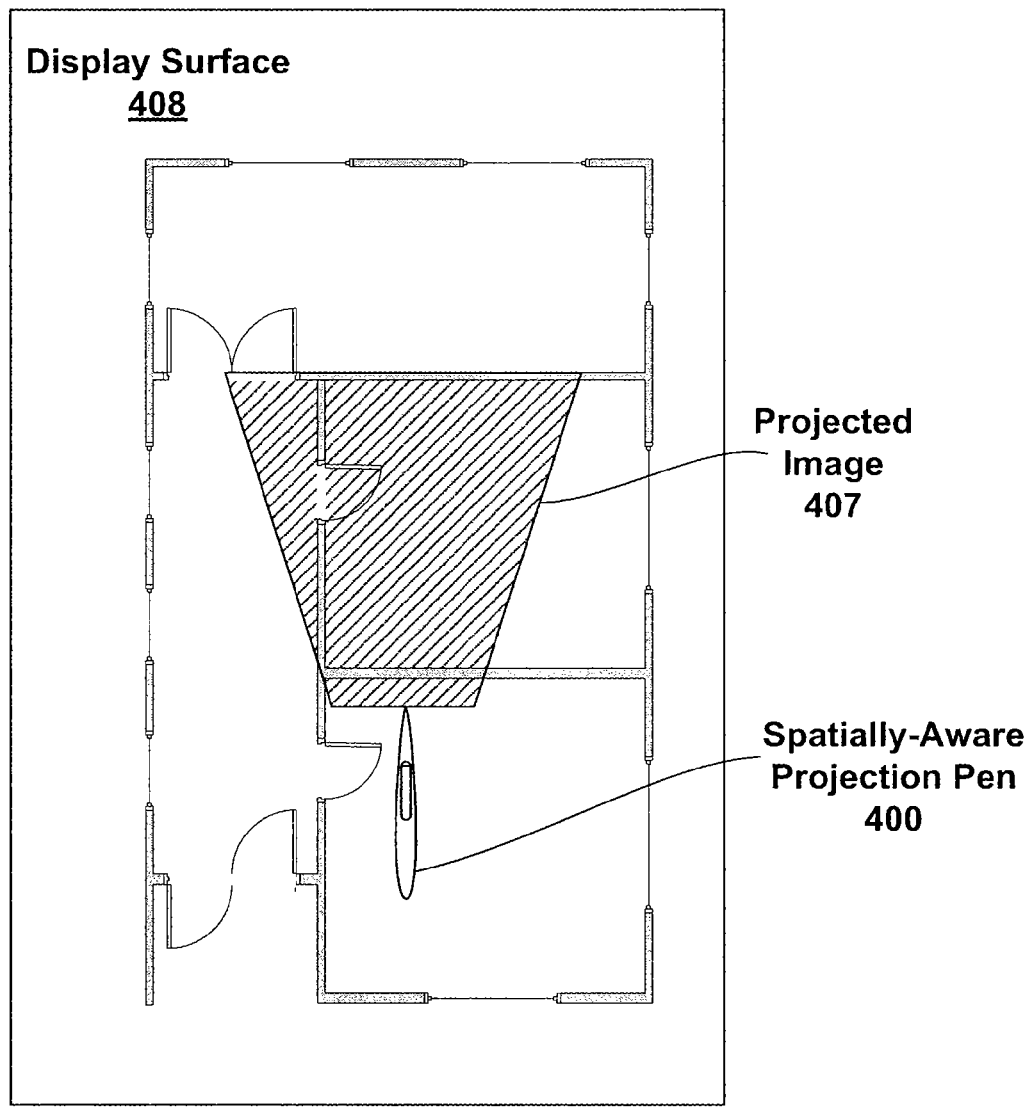
FIG. 4A illustrates a physical layer including a floorplan and a spatially-aware projection pen, according to one embodiment of the invention.

FIG. 4A illustrates a spatially-aware projection pen 400 and a physical layer including a floorplan that is printed on the display surface 408, according to one embodiment of the invention. Various layers of the design data 150 and/or image data 155 can be overlaid onto the display surface 408 within the projected image 407 that is produced by the spatially-aware projection pen 400.

Figure 4B:
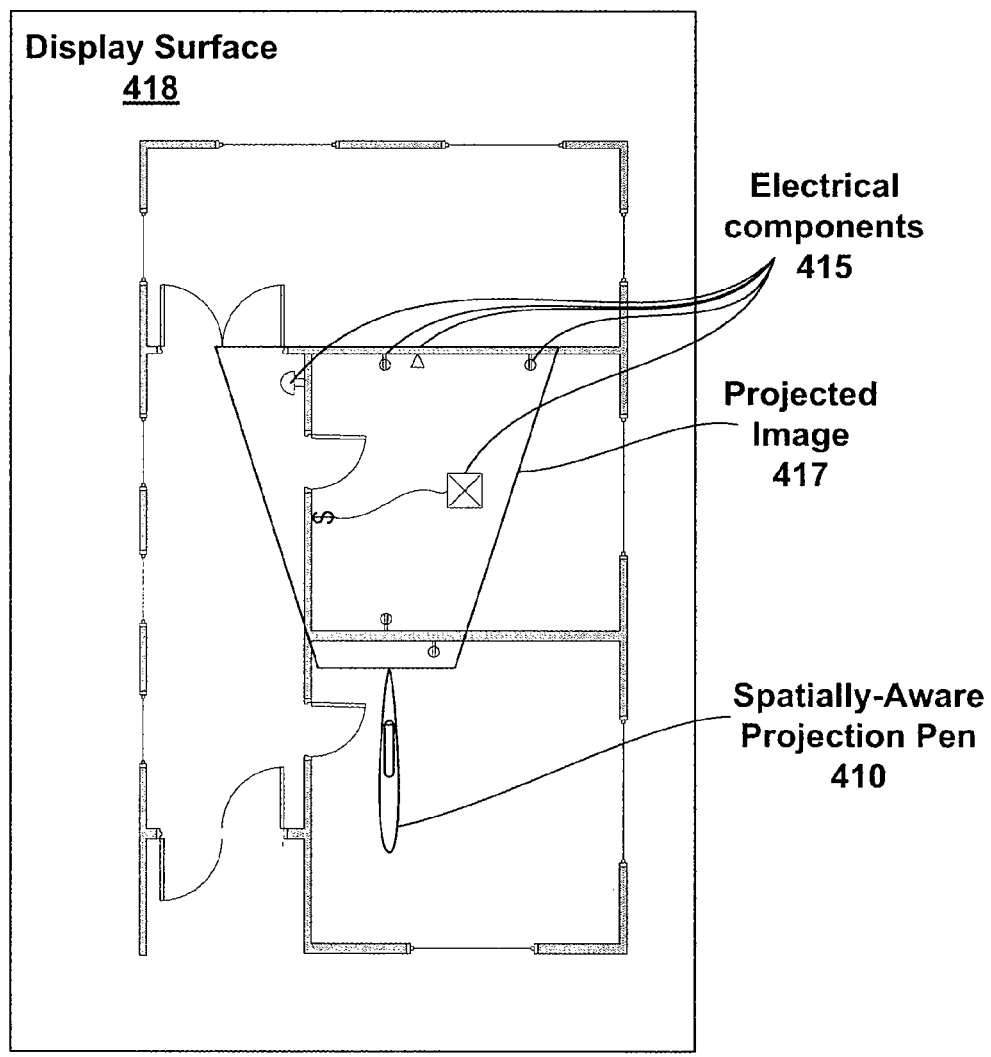
FIG. 4B illustrates a physical layer including a floorplan, a spatially-aware projection pen, and a projected image, according to one embodiment of the invention.

FIG. 4B illustrates a spatially-aware projection pen 410, a physical layer including a floorplan that is printed on the display surface 408, and a projected image 417, according to one embodiment of the invention. The projected image 417 includes electrical components 415. Note that the electrical components 415 are only visible within the projected image 417 (the peephole). In other embodiments, the projected image 417 may include additional components or additional layers, e.g., heating, ventilation, mechanical, lighting, and the like.

The overlaid content or the original physical content may be copied to another location on display surface 418 to be overlaid. The user enters a copying mode using the projected radial menu 300 and indicates an area using the spatially-aware projection pen 410 to specify a contextual parameter of the projected image 417 or the image printed on the display surface 418. The user then enters a pasting mode using the projected radial menu 300, and the copied content is displayed using the locked in-hand metaphor and copied when the user engages the input mechanism 125.

Figure 4C:
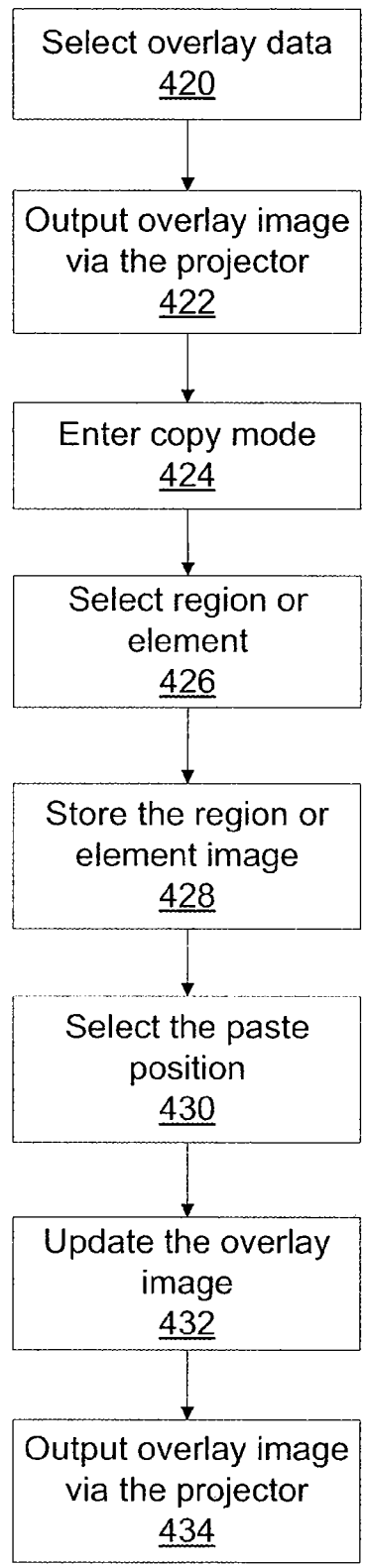
FIG. 4C illustrates a flow diagram of method steps for displaying overlay data, according to one embodiment of the invention.

FIG. 4C illustrates a flow diagram of method steps for displaying overlay data, according to one embodiment of the invention. Although the method steps are described in conjunction with FIGS. 1, 2A, 4A, and 4B, persons skilled in the art will understand that any system configured to perform the method steps, in any order, falls within the scope of the present invention.

The method begins with step 420 where the user selects the overlay data to be displayed in the projected image. The data may be selected using the projected radial menu 300. At step 422, the overlay data is displayed using the projector within the spatially-aware projection pen. At step 424, the user activates the copy mode. At step 426, the user selects a region or an element within the display surface or the projected image. The region or element may be captured using the camera within the spatially-aware projection pen. At step 428 an image of the copied region or element is stored in memory within image data 155. At step 430 the user selects a paste position within the display surface using the spatially-aware projection pen. At step 432 the overlay image is updated to include the copied region or element. At step 434 the updated overlay image is displayed using the projector within the spatially-aware projection pen.

Figure 4D:
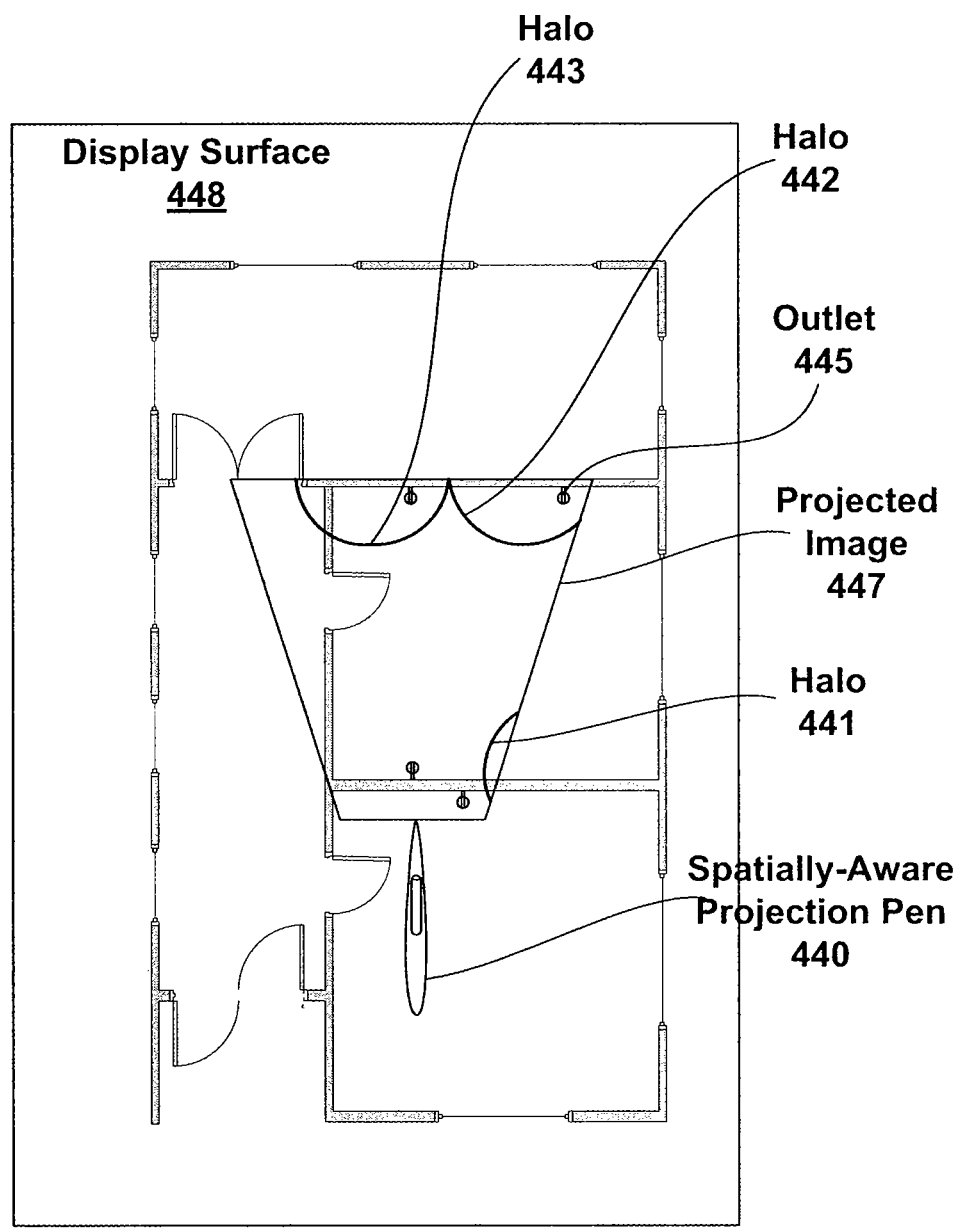
FIG. 4D illustrates a physical layer including a floorplan, a spatially-aware projection pen, and another projected image, according to one embodiment of the invention.

FIG. 4D illustrates a spatially-aware projection pen 440, a physical layer including a floorplan that is printed on the display surface 448, and another projected image 447, according to one embodiment of the invention. The virtual display layer feature of the spatially-aware projection pen enables computations to be performed and the results displayed in the contexts of the user's workspace. The user may perform a measurement query by selecting a particular element to be measured using the spatially-aware projection pen 440 and engaging a dimension tool to overlay the measurement information. Using the projected radial menu 300, the user can choose to measure a distance, path length, area, or volume. Alternatively, the user may create a line or bounding box using the spatially-aware projection pen 440, and the measurements of the line or bounding box is displayed in projected image 447. The measurement computation is displayed by the projector of the spatially-aware projection pen 440 within the projected image 447.

A search command may allow users to search for an element that exists on the display surface 448 (physical display layer). The user can perform the query in two ways. First, they can choose from a list of query elements, e.g., sprinklers, outlets, and the like, in the search menu provided by the projected radial menu 300 using a virtual cursor. Alternately, the user can directly select an instance of an element on display surface 448 or within projected image 447 using the spatially-aware projection pen 440. For example, the user may perform a query to search for electrical outlets. In response, the outlets, including outlet 445, that are within projected image 447 are displayed. Halos 442, 443, and 441 correspond to outlets that are nearby, but not within, the projected image 447. Halos 442, 443, and 441 may guide the user to additional instances of the element that was searched, allowing the user to find elements of interest faster. The user can raise the spatially-aware projection pen 440 to see a larger portion of the display, i.e., to increase the size of projected image 447, to navigate toward or to display the elements corresponding to one or more of the halos 442, 443, and 441.

Figure 4E:
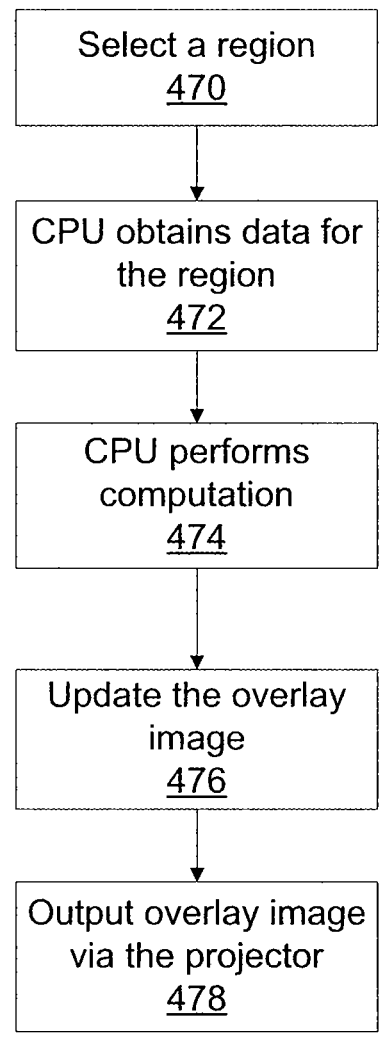
FIG. 4E illustrates a flow diagram of method steps for displaying overlay data for a computation, according to one embodiment of the invention.

FIG. 4E illustrates a flow diagram of method steps for displaying overlay data for a computation, according to one embodiment of the invention. Although the method steps are described in conjunction with FIGS. 1, 2A, 4A, and 4B, persons skilled in the art will understand that any system configured to perform the method steps, in any order, falls within the scope of the present invention.

The method begins at step 470 where the user selects a region or element on display surface 448 or within projected image 447 using the spatially-aware projection pen 440. At step 472, CPU 130 or GPU 115 obtains the data corresponding to the selected region or element. At step 474, the CPU 130 or GPU 115 performs one or more computations specified by the user. At step 476, the overlay image is updated to include the computation result. At step 478, the updated overlay image is displayed using the projector within the spatially-aware projection pen 440.

The printed content that is visible on the display surface is only one abstract view of a larger electronic file that is stored in the design data 150 within system memory 110. For example, when a two-dimensional floor plan is printed on the display surface, the spatially-aware projection pen 440 may directly access a highly detailed three-dimensional model that is stored as the design data 150 or image 155 or generated by the CPU 130 or GPU 115 using the design data 150. A view of the three-dimensional model may be displayed within the projected image that is output by the projector within the spatially-aware projection pen 440. Note that the projected image may be displayed on a display surface, such as a printed floor plan or on a blank surface.

Figure 5A:
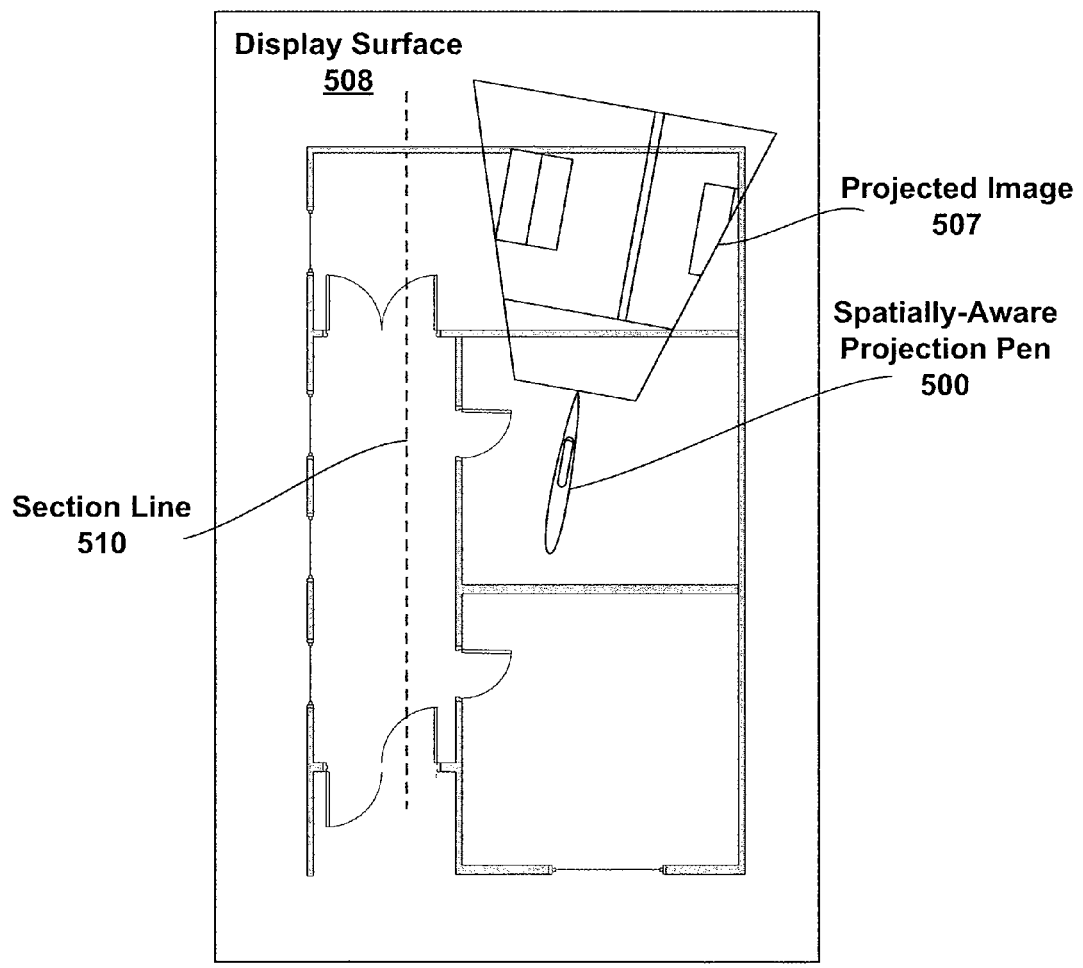
FIG. 5A illustrates a physical layer including a floorplan with a section line, a spatially-aware projection pen, and a projected image, according to one embodiment of the invention.

FIG. 5A illustrates a physical layer including a two-dimensional floorplan that is printed on the display surface 508, a spatially-aware projection pen 500, and a projected image 507, according to one embodiment of the invention. When a two-dimensional section view mode is engaged, the user may draw the section line 510 on display surface 508 using the spatially-aware projection pen 500 to define a cutting surface that is used to extract a two-dimensional section of the current three-dimensional model. A two-dimensional section view is generated based on the position and orientation of the section line 510 and displayed in the projected image 507. The two-dimensional section is locked in-hand and may be locked to a position on the display surface 508 using the input mechanism 125 on the spatially-aware projection pen 500.

Users can use the spatial input layer feature of the spatially-aware projection pen 500 to extract a three-dimensional snapshot of the current three-dimensional mode. When choosing this operation, the user may use the location and direction of the spatially-aware projection pen 500 in reference to the display surface 508 to specify the camera location and the viewing vector into the three-dimensional model. Varying the height of the spatially-aware projection pen 500 relative to the display surface 508 determines the view that is captured, e.g., the interior view (when the spatially-aware projection pen 500 is near to the display surface 508) or the exterior view (when the spatially-aware projection pen 500 is high above the display surface 508). As with the section view, the three-dimensional snapshot may be displayed in the projected image 507 and locked onto the display surface 508 or a blank surface.

Figure 5B:
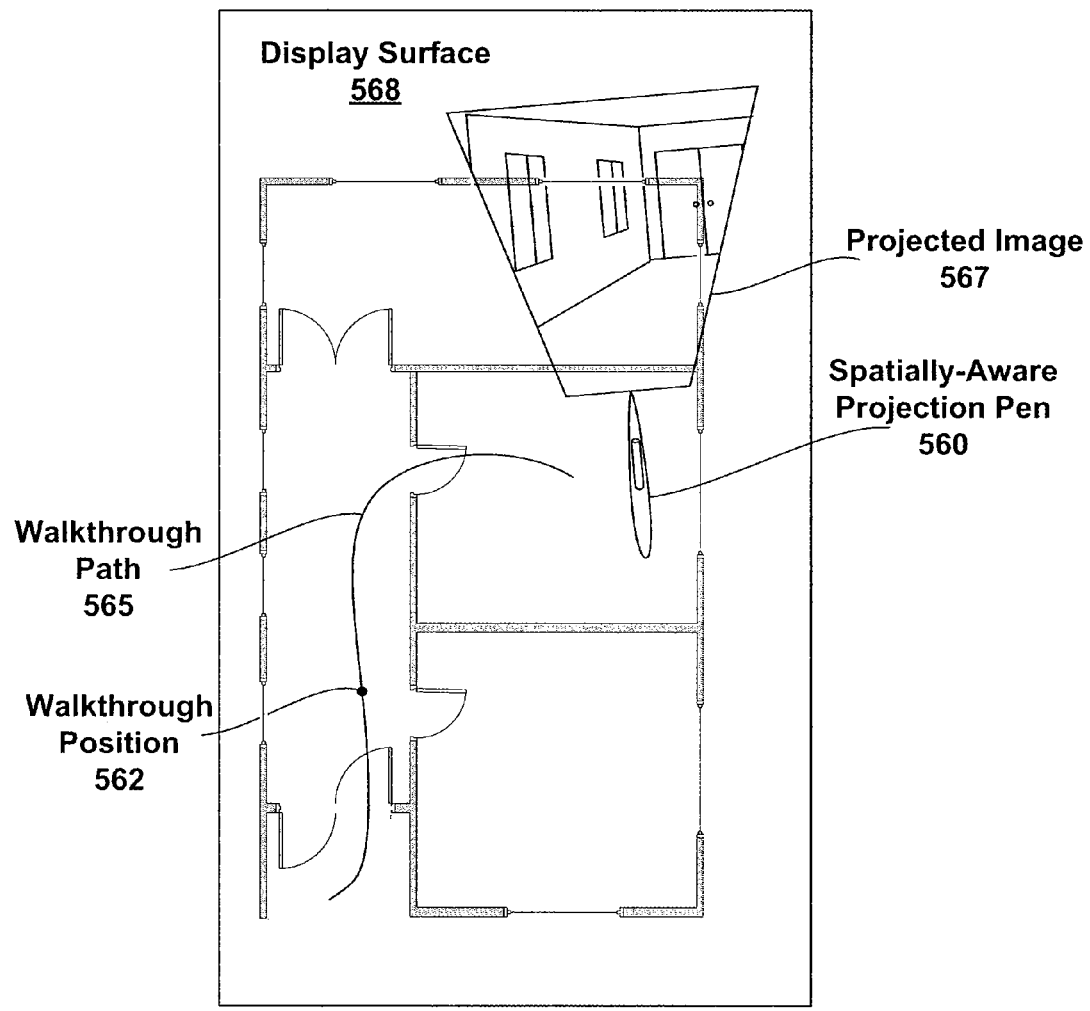
FIG. 5B illustrates a physical layer including a floorplan with a walk-through path, a spatially-aware projection pen, and a projected image, according to one embodiment of the invention.

In addition to computing and displaying two-dimensional and three-dimensional section views, the spatially-aware projection pen 500 may be used to create a two-dimensional walk-through of a three-dimensional mode. FIG. 5B illustrates a physical layer including a floorplan that is printed on the display surface 568, a spatially-aware projection pen 560, and a projected image 567, according to one embodiment of the invention. The user may draw a path, such as walk-through path 565, on the display surface 568 with the spatially-aware projection pen 560. Frames of the two-dimensional walk-through represented as pixel data, as viewed from a viewpoint moving along the walk-through path 565, are generated by the CPU 160 or the GPU 115 and stored in the image data 155 for playback as a walk-through animation. When a pen-up event is detected, the projected image 567 is locked in-hand. When the user activates the input mechanism 125, the spatially-aware projection pen 560 displays the walk-through animation in the projected image 567 and locks the projected image 567 to the display surface 568. As the frames are being displayed in the projected image 567, the walk-through position 562 indicates the position along the walk-through path 565 that corresponds to the current frame that is displayed.

Figure 5C:
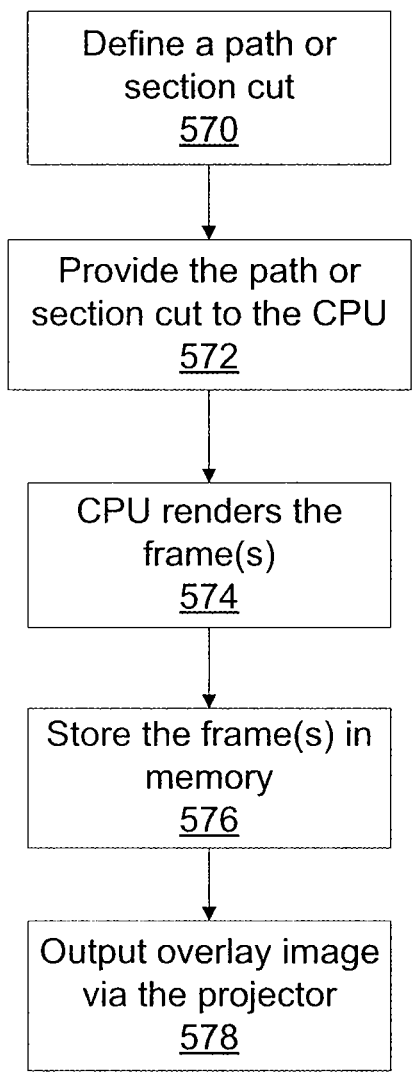
FIG. 5C a flow diagram of method steps for rendering and displaying overlay data, according to one embodiment of the invention.

FIG. 5C a flow diagram of method steps for rendering and displaying overlay data, according to one embodiment of the invention. Although the method steps are described in conjunction with FIGS. 1, 2A, 5A, and 5B, persons skilled in the art will understand that any system configured to perform the method steps, in any order, falls within the scope of the present invention.

The method begins at step 570 when the user defines a path or section cut on display surface 568 or within projected image 567 using the spatially-aware projection pen 560. At step 572, CPU 130 or GPU 115 obtains the data corresponding to the defined path or section cut. At step 574, the CPU 130 or GPU 115 renders one or more frames of pixel data to produce two-dimensional view(s) of the three-dimensional model. At step 576, the rendered frames are stored in image data 155. At step 578, the updated overlay image, including the rendered frames, is displayed using the projector within the spatially-aware projection pen 560.

In sum, the spatially-aware projection pen enables the use of virtual ink in addition to conventional physical ink. The virtual ink may be used to capture commands, annotate an existing design, and communicate with a remote user. The virtual ink may be displayed as a projected image on a display surface by the spatially-aware projection pen. Auxiliary design information and rendered images may also be displayed in the projected image. The spatially-aware feature of the projection pen allows for gestures to be interpreted differently based on the position of the spatially-aware projection pen in three-dimensional space.

Unlike a conventional digital pen, the interaction space available to the user of the spatially-aware projection pen is not merely located to the surface input layer, but extends to the space above the display surface. The integrated projector allows a user to visibly correlate information that is stored inside the pen or on any connected resource with the information illustrated on the display surface. As a result, paper is no longer just a static source of data, but it is also used as the display surface and a dynamic workspace. Virtual ink benefits the user by providing visual feedback without permanently modifying the physical display surface. The spatially-aware projection pen enables a user to interact with the design more efficiently and intuitively.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A spatially-aware projection pen system, comprising:
   an input mechanism configured to be activated and deactivated by a user;
   a position tracking mechanism configured to determine a position of the spatially-aware projection pen within a three-dimensional space and relative to a display surface;
   a memory configured to store design data, image data, and an application program, wherein the design data comprises computer-aided design (CAD) data;
   a processor configured to:
   execute the application program to generate at least a portion of the image data based on the CAD data and printed content on the display surface,
   receive input signals from the input mechanism and the position tracking mechanism, and
   generate a projected image based on the image data, the input signals and the position of the spatially-aware projection pen, wherein the projected image includes a plurality of visual components, and wherein a geometry and a location of each visual component corresponds to a different content portion of the printed content;
   a projector configured to display the projected image overlaid on the printed content, wherein a location of the projected image is locked relative to the printed content and remains static as the position of the spatially-aware projection pen changes; and
   an enclosure configured to be grasped by a human hand and house the input mechanism, the position tracking mechanism, the memory, the projector, and the processor.

2. The system of claim 1, further comprising a force sensor that is configured to detect a force applied to a tip of the spatially-aware projection pen and provide a force signal to the processor indicating whether the tip of the spatially-aware projection pen is in contact with the display surface.

3. The system of claim 2, wherein the force signal provided by the force sensor is captured as virtual ink by the processor and stored in the memory as the image data representing pen strokes input by the user.

4. The system of claim 2, wherein the projector is further configured to display virtual ink corresponding to pen strokes in the projected image when the tip of the spatially-aware projection pen is in contact with the display surface.

5. The system of claim 1, wherein the processor is configured to render a frame of pixel data using the design data and based on the position of the spatially-aware projection pen.

6. The system of claim 5, wherein the processor is further configured to store the frame of pixel data in the memory as image data.

7. The system of claim 5, wherein the processor is further configured to output the frame of pixel data to the projector and the projector is further configured to display the frame in the projected image.

8. The system of claim 5, wherein the frame of pixel data represents a two-dimensional section view of a three-dimensional model represented by the design data.

9. The system of claim 1, wherein the position tracking mechanism is further configured to determine whether the spatially-aware projection pen is within a surface input layer that includes the display surface, wherein user input received via the input mechanism when the spatially-aware projection is within the surface input layer modifies the projected image.

10. The system of claim 1, wherein the printed content comprises a second portion of the design data.

11. The system of claim 1, further comprising an ink reservoir that is configured to deposit physical ink on the display surface when a tip of the spatially-aware projection pen is in contact with the display surface.

12. The system of claim 1, further comprising a network interface that is coupled to the processor and configured to interface with a remote user.

13. The system of claim 1, wherein the projector is positioned within the enclosure to provide a field of view angle of 30 degrees.

14. The system of claim 1, wherein the processor is configured to generate a user interface that is displayed within the projected image by the projector.

15. The system of claim 1, wherein the processor is configured to render a sequence of frames of pixel data based on the design data and a path captured by the position tracking mechanism to produce a walk-through animation of a three-dimensional model represented by the design data.

16. The system of claim 1, wherein the processor is configured to generate virtual ink that is displayed in the projected image by the projector when the position tracking mechanism indicates that the spatially-aware projection pen is in contact with the display surface.

17. A spatially-aware projection pen system, comprising:
   an input mechanism configured to be activated and deactivated by a user;
   a camera configured to capture image data and determine a position of the spatially-aware projection pen within a three-dimensional space and relative to a display surface;
   a memory configured to store design data, image data, and an application program, wherein the design data comprises computer-aided design (CAD) data;
   a processor configured to:
   execute the application program to generate at least a portion of the image data based on the CAD data and printed content on the display surface,
   receive input signals from the input mechanism and the position tracking mechanism, and
   generate a projected image based on the image data, the input signals and the position of the spatially-aware projection pen, wherein the projected image includes a plurality of visual components, and wherein a geometry and a location of each visual component corresponds to a different content portion of the printed content;
   a projector configured to display the projected image overlaid on the printed content, wherein a location of the projected image is locked relative to the printed content and remains static as the position of the spatially-aware projection pen changes; and an enclosure configured to be grasped by a human hand and house the input mechanism, the position tracking mechanism, the memory, the projector, and the processor.

18. The system of claim 17, wherein the camera is further configured to determine the position of the spatially-aware projection pen in a three-dimensional space by retrieving camera calibration parameters based on traceable patterns on the display surface.

19. The system of claim 17, wherein the projector is further configured to generate virtual ink corresponding to pen strokes in the projected image when the camera indicates that the spatially-aware projection pen is in contact with the display surface.

20. The system of claim 17, wherein the camera is further configured to determine whether the spatially-aware projection pen is within a surface input layer that includes the display surface, within a hover input layer of the three-dimensional space that is directly above the display surface, or within a spatial input layer of the three-dimensional space that is directly above the hover input layer.

21. The system of claim 1, wherein the position tracking mechanism is further configured to determine whether the spatially-aware projection pen is within a hover input layer that is a fixed distance from the display surface, wherein user input received via the input mechanism when the spatially-aware projection is within the hover input layer manipulates a cursor displayed on the projected image.

22. The system of claim 21, wherein the position tracking mechanism is further configured to determine whether the spatially-aware projection pen is within a spatial input layer that is a second fixed distance from the hover input layer, wherein second user input received via the input mechanism when the spatially-aware projection is within the hover input layer manipulates a scale of the projected image.

* * * * *

UNITED STATES PATENT AND TRADEMARK OFFICE
CERTIFICATE OF CORRECTION

PATENT NO. : 9,733,792 B2
APPLICATION NO. : 12/537013
DATED : August 15, 2017
INVENTOR(S) : Song et al.

It is certified that error appears in the above-identified patent and that said Letters Patent is hereby corrected as shown below:

In the Claims

Column 15, Claim 1, Line 35, please delete "proiected" and insert --projected--.

Signed and Sealed this
Seventh Day of November, 2017

Joseph Matal
*Performing the Functions and Duties of the
Under Secretary of Commerce for Intellectual Property and
Director of the United States Patent and Trademark Office*